United States Patent
Cavanagh

(10) Patent No.: US 7,073,237 B1
(45) Date of Patent: Jul. 11, 2006

(54) TENTER FRAME JOINT

(75) Inventor: Kenneth M. Cavanagh, Warwick, RI (US)

(73) Assignee: Parkinson Technologies, Inc., Woonsocket, RI (US)

( * ) Notice: Subject to any disclaimer, the term of this patent is extended or adjusted under 35 U.S.C. 154(b) by 0 days.

(21) Appl. No.: 11/295,324

(22) Filed: Dec. 6, 2005

(51) Int. Cl.
*D06C 3/02* (2006.01)

(52) U.S. Cl. .............................. 26/89; 26/91
(58) Field of Classification Search .............. 26/89, 26/91, 93, 87, 88, 96, 98, 76, 72, 73, 53, 26/52, 51.3, 51.4; 198/850, 851, 852, 853, 198/803.3; 264/290.2, 288.4, 291; 226/170, 226/173, 174; 403/300, 305, 306, 314, 119, 403/162, 145, 397, 220, 388, 392
See application file for complete search history.

(56) References Cited

U.S. PATENT DOCUMENTS

| | | | | |
|---|---|---|---|---|
| 2,729,874 A | * | 1/1956 | McCreary | 26/91 |
| 3,066,377 A | * | 12/1962 | Waterman | 26/91 |
| 3,179,976 A | * | 4/1965 | Nash | 26/91 |
| 3,457,608 A | * | 7/1969 | Gageur | 26/93 |
| 3,490,094 A | * | 1/1970 | Pfeffer, Jr. | 26/91 |
| 3,571,846 A | * | 3/1971 | Tomlinson | 26/91 |
| 3,598,371 A | * | 8/1971 | Hyatt | 26/91 |
| 3,727,273 A | * | 4/1973 | Hyatt et al. | 26/91 |
| 4,080,692 A | * | 3/1978 | Parrillo et al. | 26/91 |
| 4,103,403 A | * | 8/1978 | Parrillo et al. | 26/91 |

* cited by examiner

*Primary Examiner*—Amy B. Vanatta
(74) *Attorney, Agent, or Firm*—Gauthier & Connors, LLP

(57) ABSTRACT

A joint is provided for articulately interconnecting the adjacent ends of rail assemblies in a tenter frame. The rail assemblies are arranged consecutively along a guide path, and have parallel guide channels for the advancing and returning legs of continuous chains carrying the clamps that grip the edges of the webs being transversely stretched. The joint includes flexible bands arranged to define intermediate channels connecting the guide channels of the rail assemblies. The flexible bands are resiliently deflected in response to articulation of the rail assemblies to thereby arcuately configure the outer medicate channels.

3 Claims, 3 Drawing Sheets

TENTER FRAME JOINT

BACKGROUND OF THE INVENTION

1. Field of the Invention

This invention relates generally to tenter frames for transversely stretching polymer webs and the like, and is concerned in particular with the provision of an improved joint for articulately interconnecting the adjacent ends of rail assemblies having parallel guide channels for the chains carrying the clamps that grip the web edges.

2. Description of the Prior Art

Conventional joints of the above-mentioned type typically comprise multiple interconnected guide segments. In addition to being expensive, such joints provide only limited ranges of articulation, typically less than about 18°. Also, the multiple guide segments are articulated by complex linkages which are prone to seizing.

The improved joint of the present invention features a much simpler and less expensive construction that resists seizing and offers an expanded range of articulation.

SUMMARY OF THE INVENTION

In accordance with the present invention, a joint is provided for articulately interconnecting the adjacent ends of rail assemblies in a tenter frame. The rail assemblies are arranged consecutively along a guide path, and have parallel guide channels for the advancing and returning legs of continuous chains carrying the clamps that grip the edges of the webs being transversely stretched.

The joint comprises a base adapted to be positioned along the guide path between adjacent ends of successive rail assemblies. A platform is supported on the base. A central pin projects vertically from the base through a slot in the platform. The slot is configured to accommodate movement of the platform in opposite directions along an axis transverse to the guide path.

The platform carries a pair of slide blocks. Each slide block is located between the central pin and a respective one of the rail assemblies, and is shiftable in opposite directions on the platform. Each rail assembly is pivotally connected to the fixed pin and to a respective one of the slide blocks.

Resiliently flexible bands are carried by the platform. The flexible bands are mechanically coupled to the rail assemblies and are arranged to define intermediate channels interconnecting the guide channels of the rail assemblies. The platform is shiftable along the aforesaid transverse axis in response to pivotal movement of the rail assemblies about the central pin, resulting in the flexible bands being resiliently deflected to arcuately configure the intermediate channels.

These and other features and attendant advantages of the present inventions will now be described in further detail with reference to the accompanying drawings, wherein:

DETAILED DESCRIPTION OF THE INVENTION

With reference now to the drawings, a joint in accordance with the present invention is generally depicted at 10. The joint provides a connection between the adjacent ends of two rail assemblies 12, 14 arranged consecutively along a path "P." Each rail assembly includes a central arm 16 and parallel chain guide channels 18. The chain guide channels each have inner and outer guide surfaces 18a, 18b.

Figure 1:
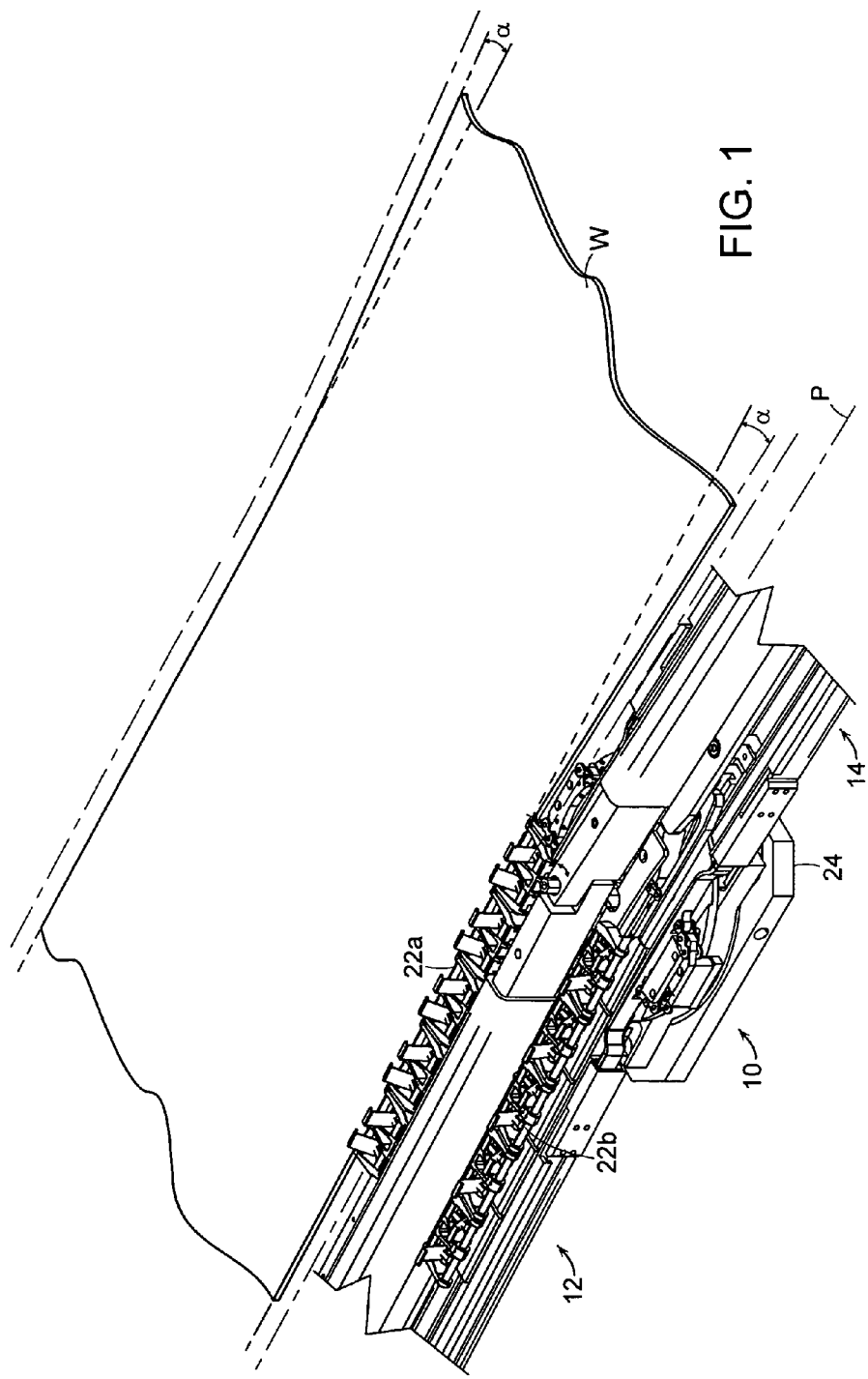
FIG. 1 is a perspective view showing a joint in accordance with the present invention interconnecting adjacent ends of two rail assemblies located on one side of a web being stretched laterally in a tenter frame. One edge of the web is shown being gripped by clamps carried by a segment of an advancing leg of a continuous chain, and a segment of the returning leg of the chain is also shown.
Figure 2:
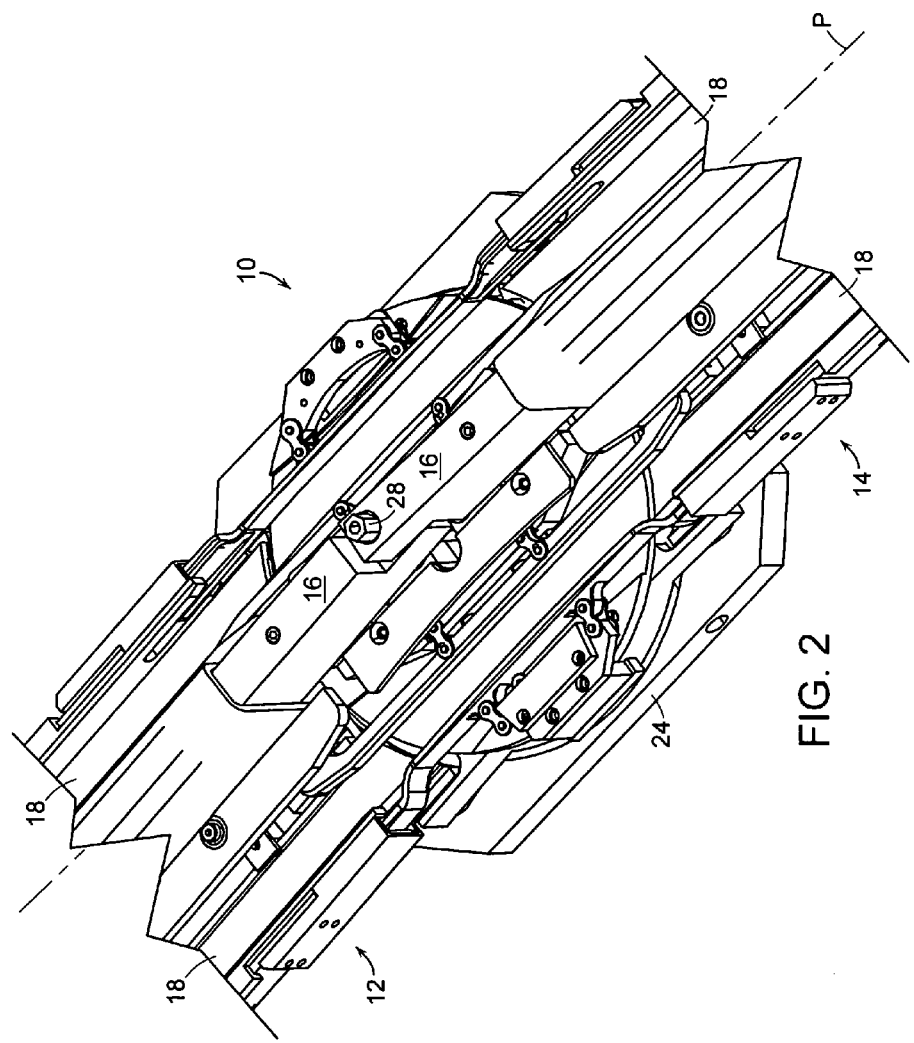
FIG. 2 is an enlarged perspective view of the joint and adjacent ends of the rail assemblies, with the web, chains and clamps omitted.

In FIG. 1, the rail assemblies 12, 14 are shown positioned along one side of a web "W" being laterally stretched in a tenter frame. The tenter frame is of conventional design, well known to those skilled in the art, and thus its construction has not been illustrated. Although not shown, it will be understood that a mirror image of rail assemblies 12, 14 and a joint 10 are provided on the opposite side of the web.

The guide channels 18 are configured and dimensioned to direct advancing and returning legs 22a, 22b of continuous chains carrying conventional clamps. The clamps are designed to releasably grip the web edges, and the joint 10 is designed to provide a degree of articulation ∞ which produces the desired lateral stretching effect.

Figure 3:
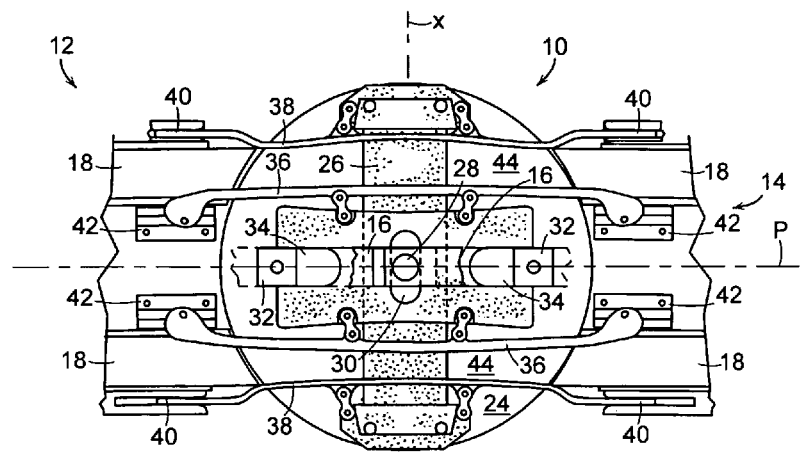
FIGS. 3 and 4 are schematic illustrations of the major components of the joint in different positions of adjustment.
Figure 4:
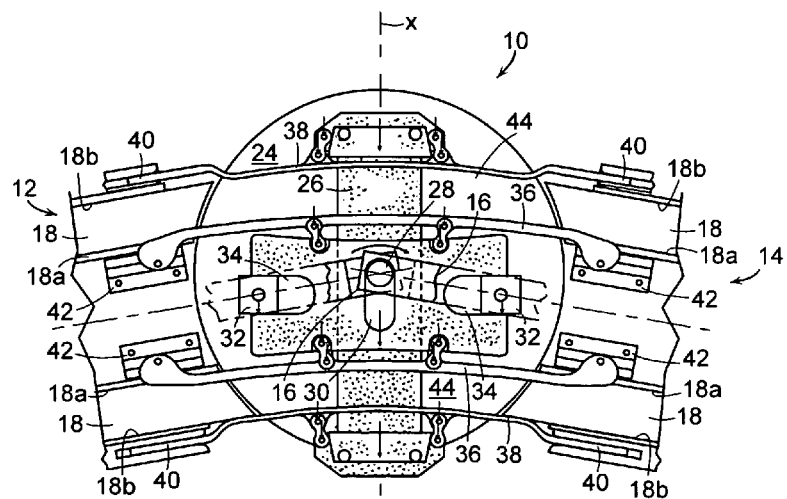

As can be best seen in FIGS. 3 and 4, the joint 10 includes a base 24 adapted to be positioned on the path P between the adjacent ends of the rail assemblies 12, 14. A platform 26 (highlighted by stippling in FIGS. 3 and 4) is supported on the base 24.

A central pin 28 projects vertically from the base 24 through a slot 30 in the platform. The slot is configured to accommodate movement of the platform 26 relative to the base 24 in opposite directions along an axis "X" transverse to the path P. Slide blocks 32 are carried by the platform 26 in slots 34. Each slide block is located between the pin 28 and a respective one of the rail assemblies 12, 14. The central arms 16 of the rail assemblies are each pivotally connected to the pin 28 and to a respective one of the slide blocks 32.

Pairs of inner and outer resiliently flexible bands 36, 38 are carried by and connected to the platform 26 by links. The ends of the outer flexible bands 38 are slidably coupled as at 40 to exterior surfaces of the rail assemblies, and similarly, the ends of the inner flexible bands 36 are slidably coupled to blocks 42 fastened to interior surfaces of the rail assemblies.

In FIG. 3, the rail assemblies 12, 14 are shown aligned on path P. The pairs of inner and outer flexible bands 36, 38 define straight intermediate channels 44 extending between and interconnecting the guide channels 18 of the rail assemblies.

In FIG. 4, the rail assemblies 12, 14 have each been pivotally displaced about pin 28 to provide angles of articulation or with respect to the path P. The platform 26 has responded to pivotal movement of the rail assemblies by shifting on base 24 along axis X in a downward direction as viewed in FIG. 4. The slide blocks 32 have shifted along the slots 34, and the ends of the flexible bands 36, 38 have been slidably displaced with respect to the rail assemblies. This all results in the flexible bands 36, 38 being resiliently deflected to arcuately reconfigure the intermediate channels 44.

Accordingly, it will now be appreciated that by employing flexible bands 36, 38 to define the intermediate channels 44, and by supporting and interconnecting such bands in the above described arrangement, a wide range of articulation of up to 35° and more can be accommodated without the use of multiple guide segments and their associated complex linkages. The simplified construction is less expensive, and less likely to malfunction.

I claim:

1. A joint for connecting the adjacent ends of rail assemblies arranged consecutively along a path, each rail assembly having parallel chain guide channels, said joint comprising:
   a base adapted to be positioned on said path between adjacent ends of said rail assemblies;
   a platform supported on said base;
   a pin projecting vertically from said base through a slot in said platform, said slot being configured to accommodate movement of said platform relative to said base in opposite directions along an axis transverse to said path;
   slide blocks carried on said platform, each slide block being located between said pin and a respective one of said rail assemblies and being shiftable in opposite directions on said platform, each of said rail assemblies being pivotally connected to said pin and to a respective one of said slide blocks; and
   resiliently flexible bands carried by said platform, said flexible bands being mechanically coupled to said rail assemblies and being arranged to define intermediate channels extending between the chain guide channels of said rail assemblies, said platform being shiftable along said axis and said slide blocks being shiftable on said platform in response to pivotal movement of said rail assemblies about said pin, resulting in said flexible bands being resiliently deflected to arcuately configure said intermediate channels.

2. The joint as claimed in claim 1 wherein the guide channels of said rail assemblies are provided respectively with inner and outer guide surfaces, and wherein said flexible bands are arranged in pairs mating with said inner and outer guide surfaces.

3. The joint as claimed in claims 1 or 2 wherein said flexible bands are slidably connected to said rail assemblies.

* * * * *